July 25, 1933.  W. O. CROSBY  1,919,828
LIQUID MEASURING SYSTEM
Original Filed March 6, 1929   5 Sheets-Sheet 1

INVENTOR
Walter O. Crosby
BY John Flam
ATTORNEY

July 25, 1933.  W. O. CROSBY  1,919,828
LIQUID MEASURING SYSTEM
Original Filed March 6, 1929  5 Sheets-Sheet 2

INVENTOR
Walter O. Crosby
BY John Flam
ATTORNEY

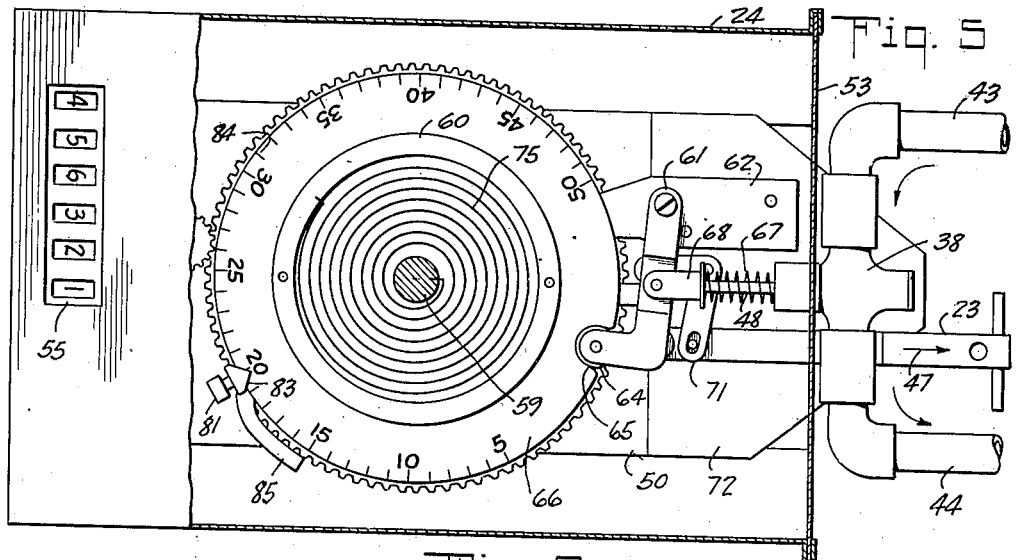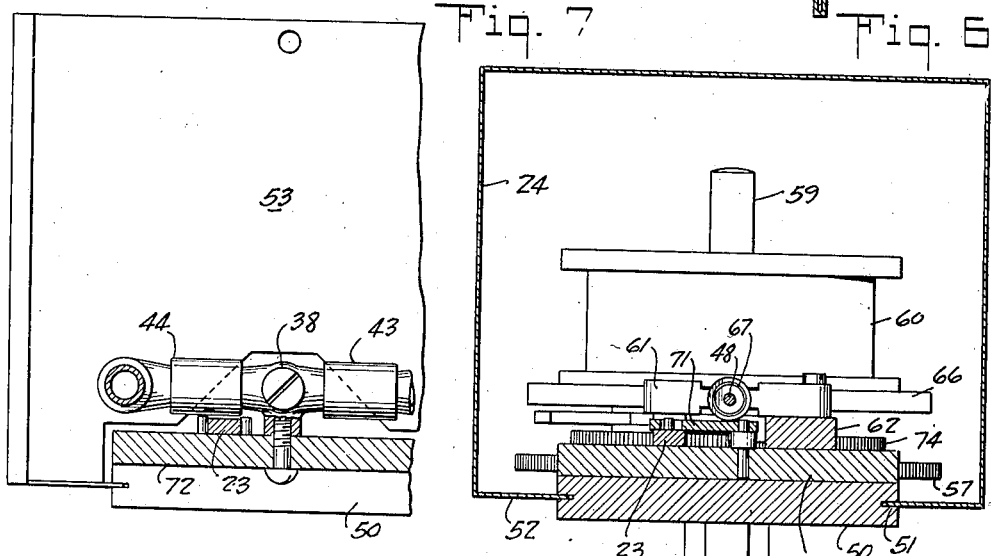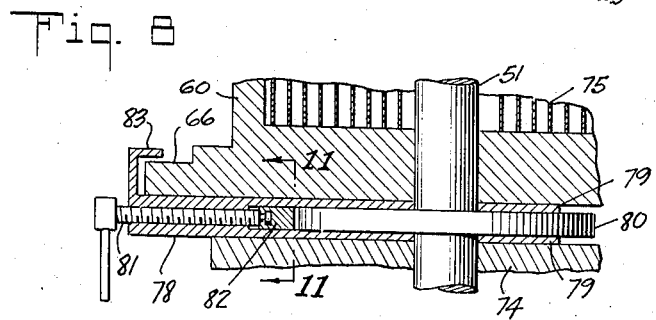

July 25, 1933.   W. O. CROSBY   1,919,828
LIQUID MEASURING SYSTEM
Original Filed March 6, 1929   5 Sheets-Sheet 4

INVENTOR
Walter O. Crosby
BY John Flann
ATTORNEY

July 25, 1933.  W. O. CROSBY  1,919,828
LIQUID MEASURING SYSTEM
Original Filed March 6, 1929  5 Sheets-Sheet 5
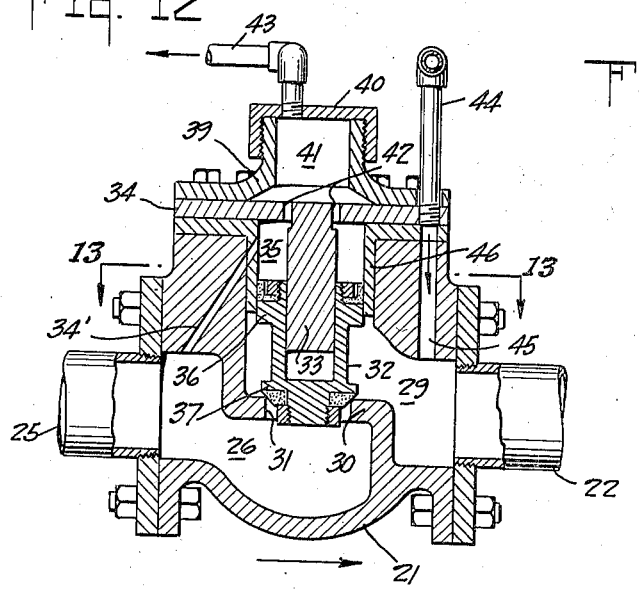
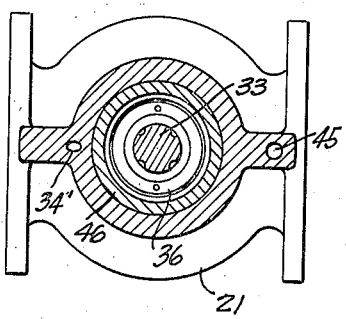
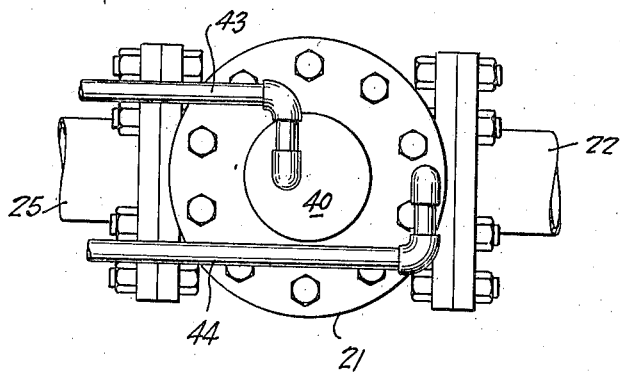
INVENTOR
Walter O. Crosby
BY John Flam
ATTORNEY Patented July 25, 1933

1,919,828

UNITED STATES PATENT OFFICE

WALTER O. CROSBY, OF LOS ANGELES, CALIFORNIA, ASSIGNOR TO FRANCIS WALTER GUIBERT, OF BEVERLY HILLS, CALIFORNIA

LIQUID MEASURING SYSTEM

Application filed March 6, 1929, Serial No. 344,823. Renewed February 21, 1933.

This invention relates to a scheme whereby predetermined amounts of liquid are supplied. For example, my apparatus can be used for filling bottles or other containers with water or liquid of any predetermined weight or volume.

It is accordingly one of the objects of my invention to provide a liquid dispenser or measurer that can be accurately set to deliver accurately a definite quantity within the limits of adjustment of the apparatus.

One type of installation in which my invention finds advantageous application is in connection with the mixing of concrete. It is well understood that if the ratio of water to the sand, gravel and cement is varied, there is an optimum value, that lends the greatest strength to the completed concrete structure. For example, roads made from concrete have been found to vary very greatly in strength, due to variations in the water content of the mix. This condition has to some extent been remedied by first insuring that the concrete mixture when placed on the roadbed will be maintained intact against absorption by the soil (as by placing waterproof felt between the roadbed and the mix), and then accurately measuring the water to the mix. This has been accomplished in the past by using a measuring vessel. But such systems introduce the human element, and the operator can if he so desires, change the amount of water added to each mix, without any supervisory authority.

Such authority is necessary due to the fact that the sand entering into the mix may be wet, the amount of moisture varying from time to time. It is accordingly advantageous to provide inspection, and to determine the amount of water to be added to the mix in accordance with observations on the moisture already present before the water is added.

With the aid of my invention, an inspector can set the water measuring device to deliver only a definite amount of liquid, and this amount cannot be altered by the operator. The inspector or supervisor can from time to time adjust the device as occasion requires, and he requires a key or the like to accomplish this result.

It is therefore another object of my invention to provide a concrete mixing system in which the quantity of water added to the mix cannot be adjusted by any than an authorized person.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limited sense, since the scope of my invention is best defined by the appended claims.

Referring to the drawings:

Fig. 5 is a similar sectional view, but taken along plane 5—5 of Fig. 3;

Fig. 6 is a cross section taken along plane 6—6 of Fig. 3;

Fig. 7 is a similar sectional view, but taken along plane 7—7 of Fig. 3;

Fig. 8 is an enlarged detail section, taken along plane 8—8 of Fig. 4;

Fig. 12 is a cross sectional view of one form of a valve that can be used in connection with my device;

Fig. 13 is a sectional view thereof, taken along plane 13—13; and

Fig. 14 is a top plan view thereof.

Figure 1:
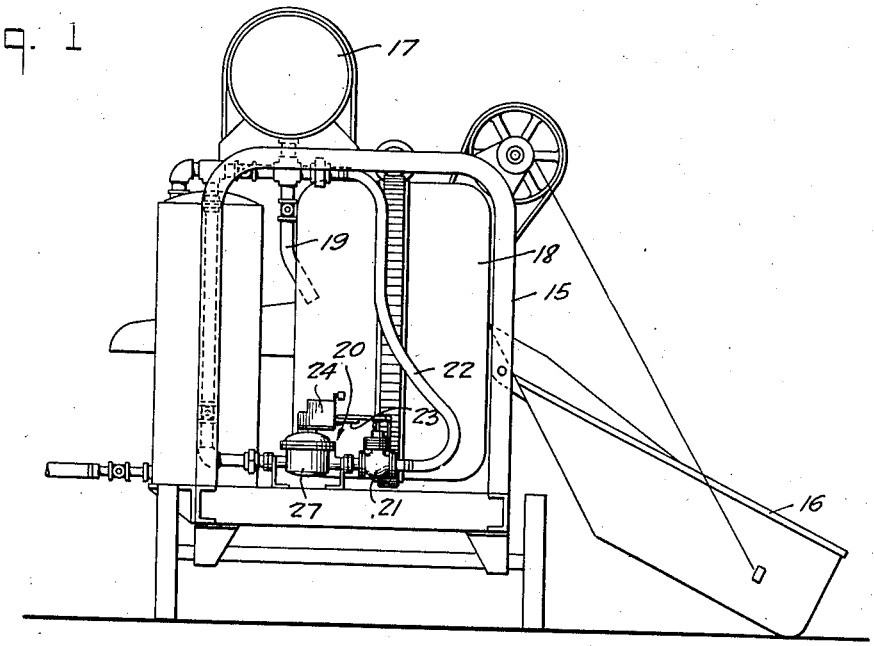
Figure 1 is a diagrammatic view of an installation, including a concrete mixer, that includes my measuring device.
Figure 2:
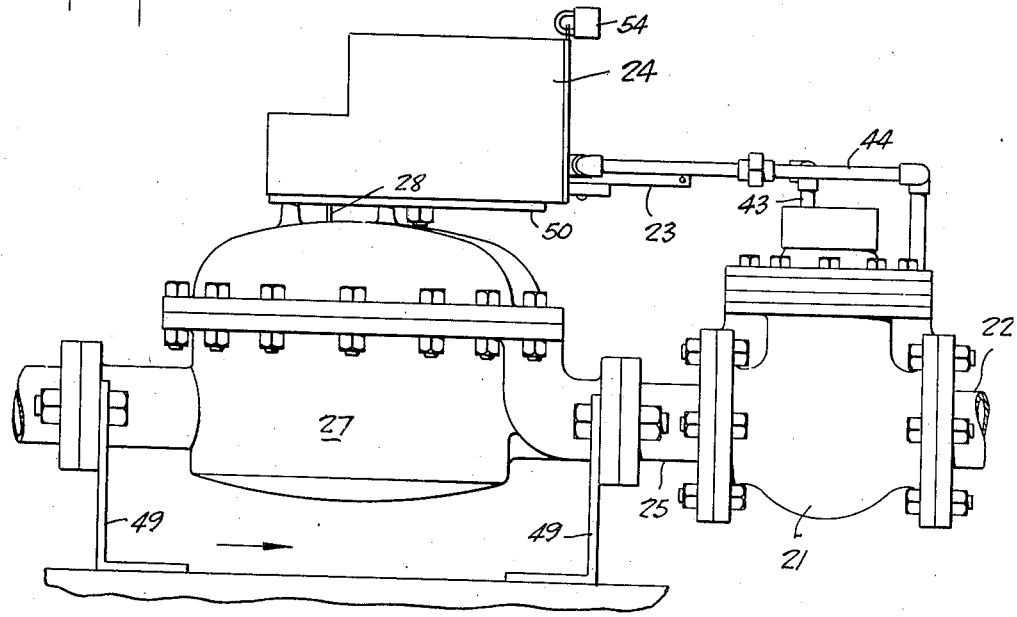
Fig. 2 is an enlarged side elevation of a measuring device embodying my invention.

In Fig. 1, I show in general a concrete mixer 15 having a dumping scoop 16, a water tank 17, and a rotatable mixing drum 18. Water can be passed into the drum 18 as through a pipe 19. By appropriate pipe connections, the water can be supplied either directly from the tank 17, or through a water measuring device 20. This device forms an important part of my invention, and the other figures of the drawings show the structure thereof in detail.

The arrangement in fact can be such that a valve 21 can be caused to deliver a measured or predetermined quantity of water to pipe 22, when a lever or rod 23 is pulled for a limited distance outwardly from a casing 24. This movement of rod 23 is effective to open valve 21; and after a predetermined quantity of water is passed through the valve, it is automatically closed. Before explaining in detail how this automatic feature is accomplished, I shall describe, with the aid of Figs. 12, 13 and 14, one form of valve that can be utilized in connection with the system.

Figure 3:
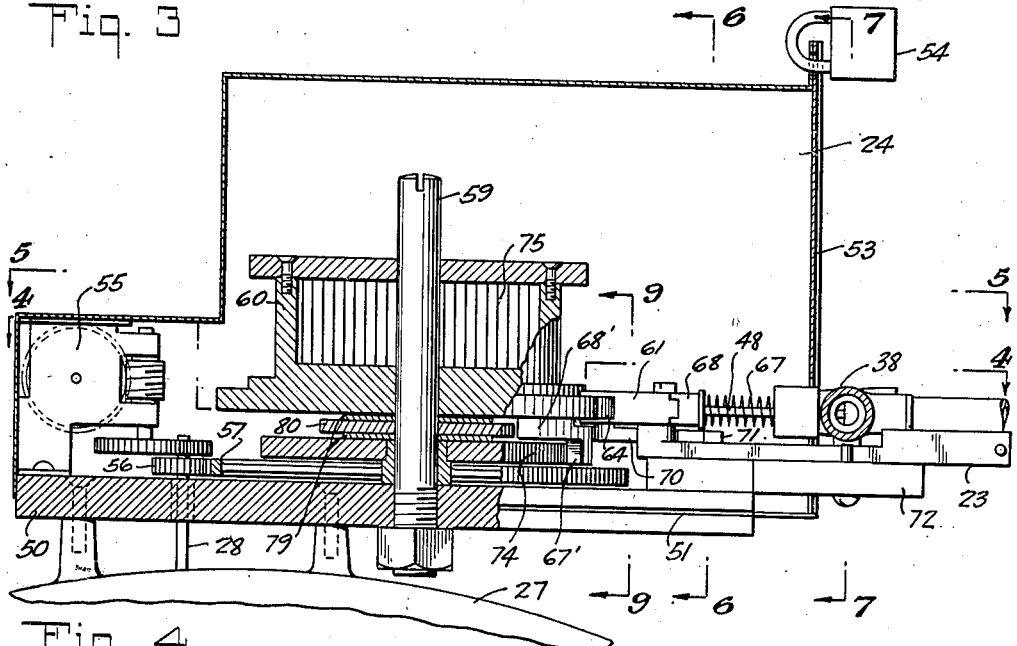
Fig. 3 is an enlarged sectional view of the main operating parts of the device.
Figure 4:
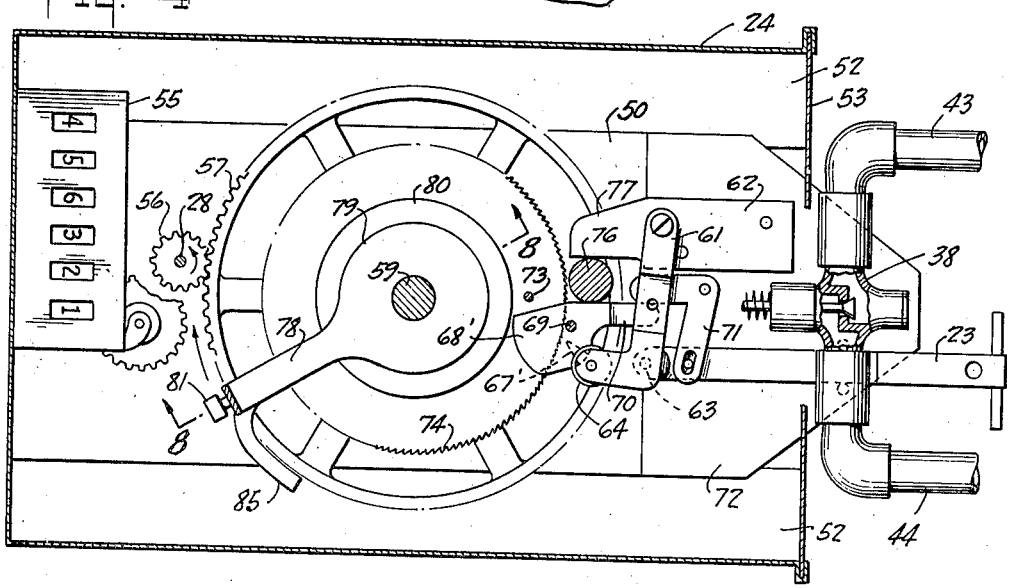
Fig. 4 is a sectional view, taken along plane 4—4 of Fig. 3.
Figure 9:
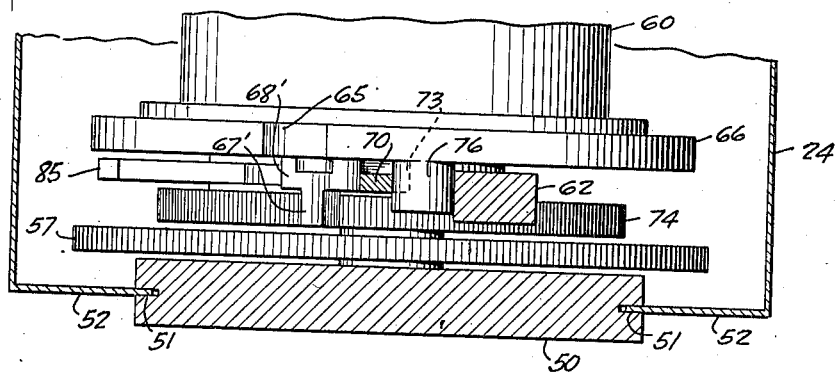
Fig. 9 is a detail section, taken along plane 9—9 of Fig. 3.

The valve inlet is shown as comprising a pipe 25, connected as by a flange to the valve body and in communication with the inlet chamber 26 therein. Water is delivered to this pipe through a water meter 27 of any standard, reliable make. This meter, as shown in Figs. 3 and 4, actuates a shaft 28, the extent of rotation of which serves to indicate the volume of water passing through the meter. It also serves, in a manner to be described hereinafter, to actuate the closing mechanism for the valve 21 after plunger or rod 23 is actuated, and after a definite weight or volume of water is delivered.

Valve 21 is provided with an outlet chamber 29, leading to the pipe 22 that delivers water to the drum 18. A valve seat 30 is arranged between the two chambers 26 and 29; it has an opening 31 controlled by a valve closure member 32. This closure member is in the form of a piston, slidable on a central guide rod 33 that is fixed in a top plate 34 covering the valve body. Closure 32 is so arranged that the water pressure in conduit 25 can act to hold it closed. For example, there is a port 34' that leads liquid from intake 26 to the top of closure 32. The pressure in space 35 acts upon a large piston 36 formed on closure 32. This piston works in a guide member 46. The same pressure acts against the smaller lower piston 37; and therefore there is a preponderance of the force acting to move the closure 32 to seating position.

However, it is apparent that if the pressure in space 35 is relieved, the valve closure 32 can be lifted by the pressure exerted below it. This can be accomplished by providing a valve 38 (Fig. 4) that controls the outlet of water from chamber 35. Thus a bell 39 and cap 40 are provided above space 5, and the space 41 formed therein is in communication with space 35, as by ports 42. A pipe 43 leads from space 41 to control valve 38, and from this valve, a pipe 44 leads into the discharge space 29, as through the port 45. It is evident that port 34', pipe 43, valve 38 and pipe 44 form a shunt line around valve closure 32. If this line is closed, as when valve 38 is closed, the main valve 31 is closed. As soon as valve 38 is opened, pressure is relieved above piston 36, and valve closure 32 opens.

The operation of rod 23, as by pulling it in the direction of the arrow 47 (Fig. 5) causes stem 48 of the valve 38 to move to open position. I shall now explain how this stem is operated to perform a cycle of fluid measurement.

Referring to Figs. 2 to 10 inclusive, it is seen that meter 27, which is supported on the concrete mixer as by the legs 49, in turn supports a base 50. This base as shown most clearly in Figs. 6, 7, and 9, has a groove 51 in each longitudinal edge, to permit casing 24 to be supported thereon, as by aid of the inturned opposing edges 52. Casing 24 has a vertical slide cover 53 (Figs. 3, 4, 5) that can be held locked as by lock 54 to prevent unauthorized tampering of the measuring mechanism. It is also seen in Figs. 3 and 4 that shaft 28 of meter 27 actuates a transmission mechanism for a register 55, the scale of which is readable through a window in the casing 24. This register can indicate the total gallons or pounds of water delivered through meter 27.

Figure 10:
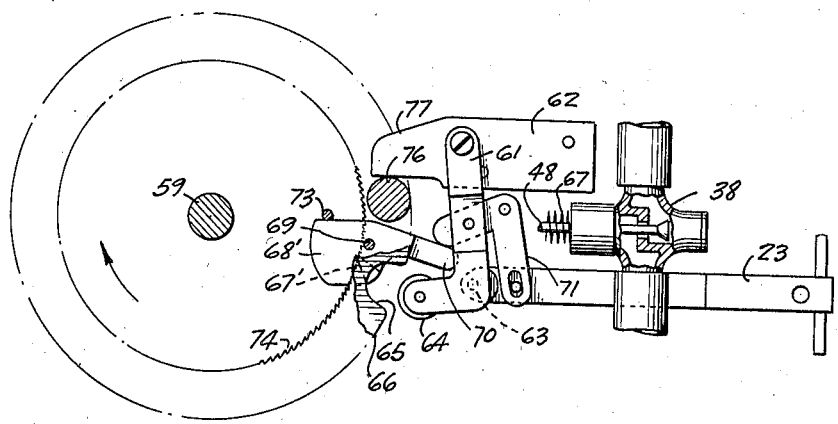
Fig. 10 is a view similar to Fig. 4, showing another phase of operation of the device.
Figure 11:
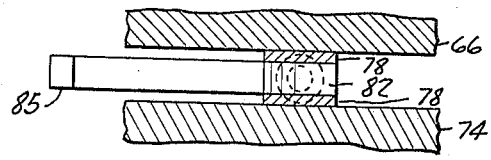
Fig. 11 is a detail section, taken along plane 11—11 of Fig. 8.

Shaft 28 also actuates, as by pinion 56, a mechanism that serves to return valve 38 to closed position after a definite amount of water has passed the meter 27. Thus a gear wheel 57 is rotatable on a stationary shaft 59, and is adjacent the upper face of base 50. This gear wheel is free to be rotated by the meter shaft 28 while valve 38 is closed; but of course due to the fact that the valve is thus closed, the meter 27 of course is not delivering any water and the shaft 28 is at rest. The act of pulling plunger 23 serves not only to open the valve as hereinbefore stated, but also to connect gear 57 with a spring drum 60. Thus as shown in Figs. 4 and 10, a lever 61 is pivoted on a member 62, and is connected as by a slot and pin connection 63 with plunger 23. This lever carries a roller 64 arranged to enter into a deep slot 65 in a flange 66 on drum 60. When it is in the position of Fig. 5, the drum 66 is held from rotating. The act of pulling plunger 23 frees roller 64 as shown in Fig. 10; it also, through the interposition of clevis 68 on stem 48 of valve 38, acts to open this valve against the seating action of spring 67. This spring, after plunger 23 is released, urges the valve 38 to closing position, by acting on clevis 68 that is pivotally engaged with lever 61. However, valve 38 must remain open until or unless the slot 65 is opposite roller 64; for otherwise, this roller merely contacts with the periphery of flange 66 and the stem 48 is prevented from moving toward the left to seat the valve closure.

Flange 66 carries a pawl structure 67', which is also so actuated by movement of plunger 23, as to connect gear 57 with drum 60. This structure includes a lever 68' pivoted on the under side of flange 66 as by pin 69. It has a projection 70 in the path of movement of one arm of a bell crank lever 71, the other arm of which is connected to plunger 23. Lever 71 is pivoted on a piece 72 fastened to a base 50; and member 62 is fastened to this piece.

As plunger 23 is pulled outwardly, lever 71 serves to rock lever 68' in a clockwise direction, until it is stopped by pin 73 fastened to flange 66. This rocking movement throws pawl 67' carried by lever 68' into engagement with the teeth on a ratchet wheel 74. This wheel is fastened rigidly to the hub of wheel 57, so that if meter 27 is registering, the wheel 74 is rotated in a clockwise direction, and due to engagement of pawl 67', the drum 60 is also rotated in a clockwise direction.

Drum 60 encloses a spring 75, the inner end of which is tight on arbor or shaft 59, and the outer end of which is fastened to drum 60. Thus as this drum is rotated, the spring is wound up.

The arrangement is such that after the drum rotates a definite amount, the pawl 67' becomes disengaged, and the drum 60 is returned by spring 75 to the initial position of Fig. 5. A stop pin 76 carried by flange 66 then contacts with a projection 77 (Fig. 10) on member 62 to stop the backward rotation of the drum. Assuming that plunger 23 is not being pulled outwardly, the return of the drum 60 to starting position permits roller 64 to enter slot 65, as is clearly indicated in the position of Fig. 10. Thus spring 48 is free to urge the roller inwardly, and to close the valve 38, completing the measuring operation.

I provide a mechanism that can be adjusted to determine how far drum 60 is permitted to rotate before disengagement of pawl 67'. This is all securely under the cover or casing 24, and can be done only by an authorized person, who desires to vary the amount of water delivered to each batch in the mixer through meter 27. Thus an arm 78 (Figs. 4 and 8) has flanges 79 rotatable on arbor 59 and encompassing a disc 80 fast on the arbor. A thumb screw 81 extends radially through arm 78 and operates a square shoe 82 to urge it into frictional engagement with the edge of disc 80. In this way, arm 78 can be held in any adjusted position, its setting being facilitated by the aid of a pointer 83 cooperating with a scale 84 (Fig. 5) on the upper surface of flange 66. This scale can be calibrated in gallons or pounds of water.

Arm 78 carries a lateral projection 85 (Figs. 4 and 5) that is arranged to contact with arm 70 as the drum 60 brings this arm toward the projection. Thus this projection serves, after a definite angular movement of drum 60, to rotate structure 68' to free pawl 67' from wheel 74. Then drum 60 is released and returns to its starting position.

The description of the mechanism is now complete. Assume that pointer 83 is set to the proper position and that the meter 27 is at rest and the valve 38 closed. Now if it is desired to deliver water to the drum 18 of the mixer, the plunger 23 is pulled, and it is retained in the pulled out position for a short interval. The valve 38 is thereby opened; water is discharged through it and main valve 21. Meter 27 rotates shaft 28, in turn rotating gear 56, gear 57, and wheel 74. Since pawl 67' has been urged by lever 71 into engagement with wheel 74, drum 60 is rotated. When it has rotated sufficiently to bring slot 65 out of register with roller 64, plunger 23 can be released. As drum 60 continues to rotate, the roller 64 rides on the periphery of flange 66.

Continued rotation of drum 60 finally brings arm 70 into contact with projection 85; pawl 67' is released, and drum 60 is free to return to starting position under the influence of spring 75. The roller 64 then enters slot 65, and valve 38 closes. The delivery of water through meter 27 stops.

It is apparent that the calibrations 84 can be made so as to show accurately in conjunction with pointer 83, the number of gallons or pounds of water delivered during the complete cycle as just described. Even after pawl 67' is disconnected, the meter 27 delivers water, up to the time the valve 38 recloses. This can be all compensated for in the calibration.

I claim:

1. In a device of the character described, a liquid flow meter, a valve connected thereto, said valve having means whereby the pressure of the liquid can keep it in closed position, and means whereby said pressure is released to open the valve.

2. In a device of the character described, a liquid flow meter, a valve connected thereto, said valve having means whereby the pressure of the liquid can keep it in closed position, means whereby said pressure is released to open the valve, and means responsive to the passage of a definite amount of liquid to permit the liquid pressure to reclose the valve.

3. The combination as set forth in claim 1, in which the means for keeping the valve closed is a piston closure member that is overbalanced by the liquid pressure to keep it closed.

4. The combination as set forth in claim 2, in which the means for keeping the valve closed is a piston closure member that is overbalanced by the liquid pressure to urge it to closed position, and in which the pressure releasing means is a device for varying the pressure on one side of the piston.

5. In a device of the character described, a member movable in accordance with the amount of liquid passing a given locality, a valve mechanism including a valve to control the flow of liquid, means for releasing the movable member after it has reached a definite position, and means actuated in response to the reverse movement of the member to close the valve.

6. The combination as set forth in claim 5, in which the means to close the valve has a projection adapted to enter a recess permitting it to go to closing position, said recess being arranged in the movable member.

7. The combination as set forth in claim 5, with the addition of means urging the movable member in a direction reverse to its movement by the passage of liquid.

8. In a device of the character described, a movable member, means urging the member in one direction, means responsive to the flow of liquid to move the member in the opposite direction, and means operated by said movable member to control the flow of fluid.

9. In a device of the character described, a movable member, means urging the member in one direction, means responsive to the flow of liquid to move the member in the opposite direction, means operated by said movable member to control the flow of fluid, and means for releasing the movable member to permit the urging means to act upon a definite movement of the movable member.

10. The combination as set forth in claim 8, in which the means operated by said movable member to control the flow of fluid includes a stem having a projection adapted to enter into a recess in the movable member when the movable member reaches a definite position.

11. The combination as set forth in claim 9, in which the means operated by said movable member to control the flow of liquid includes a stem having a projection adapted to enter into a recess in the movable member when the movable member reaches a definite position.

12. The combination as set forth in claim 9, with the addition of means whereby the movement of the movable member before it is released can be adjusted.

13. In a device of the character described, a movable member, means urging the member in one direction, means responsive to the flow of liquid to move the member in the opposite direction, means operated by said movable member to control the flow of fluid, and means for releasing the movable member to permit the urging means to act upon a definite movement of the movable member, including a detachable connection for the movable member, and an abutment arranged to release the connection when the member reaches a definite position.

14. The combination as set forth in claim 13, with the addition of adjustable means whereby the movement of the movable member can be controlled.

15. In a device of the character described, a spring, a wheel urged to rotate in one direction by the spring, means urging the wheel in the opposite direction in response to the flow of liquid, a pawl for connecting the said means to the wheel, an abutment for releasing the pawl when the wheel has been rotated by said means by a definite amount, so that the spring can rotate the wheel in a reverse direction, and a valve mechanism actuated by the wheel when it returns under the action of the spring, to interrupt the flow of liquid.

16. In a device of the character described, a spring, a wheel urged to rotate in one direction by the spring, means urging the wheel in the opposite direction in response to the flow of liquid, a pawl for connecting the said means to the wheel, an abutment for releasing the pawl when the wheel has been rotated by said means by a definite amount, so that the spring can rotate the wheel in a reverse direction, a valve mechanism actuated by the wheel when it returns under the action of the spring, to interrupt the flow of liquid, and means whereby the valve mechanism can be operated for starting the flow of liquid.

17. In a device of the character described, a spring, a wheel urged to rotate in one direction by the spring, means urging the wheel in the opposite direction in response to the flow of liquid, a pawl for connecting the said means to the wheel, an abutment for releasing the pawl when the wheel has been rotated by said means by a definite amount, so that the spring can rotate the wheel in a reverse direction, and a valve mechanism actuated by the wheel when it returns under the action of the spring, to interrupt the flow of liquid, said valve mechanism including a cam follower coacting with a surface of the wheel to provide a control movement.

18. In a device of the character described, a spring, a wheel urged to rotate in one direction by the spring, means urging the wheel in the opposite direction in response to the flow of liquid, a pawl for connecting the said means to the wheel, an abutment for releasing the pawl when the wheel has been rotated by said means by a definite amount, so that the spring can rotate the wheel in a reverse direction, and a valve mechanism actuated by the wheel when it returns under the action of the spring, to interrupt the flow of liquid, said valve mechanism including a cam follower coacting with a surface of the wheel, a plunger connected to the follower, and means for lifting the follower from the surface to initiate the flow of liquid.

19. In a device of the character described, a wheel, means urging the wheel to rotate in one direction, means urging the wheel to rotate in the opposite direction in response to the flow of liquid, a pawl for connecting the latter means to the wheel, an abutment for releasing the pawl when the wheel has been rotated by said latter means by a definite amount, so that the first means can rotate the wheel in a reverse direction, and a valve mechanism actuated by the wheel when it returns under the action of the first means, to interrupt the flow of liquid.

20. In a device of the character described, a valve, a member movable in accordance with the amount of liquid delivered past the valve, and means for causing said valve to close, comprising an adjustable means for limiting the movement of said member, means for returning said member to an initial position upon completion of its movement, means urging the valve to closed position and effective only when said member is in initial position, whereby opening of said valve causes a successive cycle of movement of the member to take place for subsequently closing the valve, without the necessity of readjusting said adjustable means.

21. In a device of the character described, a valve, a member movable in accordance with the amount of liquid delivered past the valve, adjustable means for limiting the movement of said member, means for opening the valve and thereby initiating the movement of the member, and mechanism responsive to the arrival of the member to its limit of movement for closing the valve, said mechanism including means whereby said adjustable means remains effective to limit a successive movement of said member, upon reopening said valve.

22. In a device of the character described, a valve, a member movable in accordance with the amount of liquid delivered past the valve, adjustable means for limiting the movement of said member, means for opening the valve, and mechanism actuated upon the completion of said limited movement for causing the valve to close, said mechanism including means whereby said adjustable means is retained in such position that it is effective to determine a successive movement of said member.

WALTER O. CROSBY.